United States Patent [19]

Ahuja et al.

[11] Patent Number: 5,740,036
[45] Date of Patent: Apr. 14, 1998

[54] METHOD AND APPARATUS FOR ANALYZING GEOLOGICAL DATA USING WAVELET ANALYSIS

[75] Inventors: Chander M. Ahuja; Charles C. Mosher, both of Plano, Tex.

[73] Assignee: Atlantic Richfield Company, Los Angeles, Calif.

[21] Appl. No.: 528,916

[22] Filed: Sep. 15, 1995

[51] Int. Cl.$^6$ ........................................... G06F 17/10
[52] U.S. Cl. ............................................... 364/321
[58] Field of Search ........................... 364/421, 422; 395/929; 367/43–46, 68, 69, 70, 71, 72, 73

[56] References Cited

U.S. PATENT DOCUMENTS

| 4,608,673 | 8/1986 | Lazear | 364/421 |
| 4,870,580 | 9/1989 | Lang et al. | 364/421 |

OTHER PUBLICATIONS

Daubechies, "Orthonormal Bases of Compactly Supported Wavelets", *Communications on Pure and Applied Mathematics*, vol. XLI (John Wiley & Sons, 1988), pp. 909–966.
Foster, et al., "Wavelet transform methods for geophysical applications", *Expanded Abstracts with Biographies: 1994 Technical Program of the SET International Exposition and 64$^{th}$ Annual Meeting* (SEG, 1994), pp. 1465–1468.

Miao, et al., "Application of the wavelet transform in seismic data processing", *Expanded Abstracts with Biographies: 1994 Technical Program of the SET International Exposition and 64$^{th}$ Annual Meeting* (SEG, 1994), pp. 1461–1464.
Meyer, *Wavelets: algorithms and applications* (Society for Industrial and Applied Mathematics, 1993), pp. 26–27.
Vetterli, et al., "Perfect reconstruction FIR filger banks: some properties and factorizations", *IEEE Trans. ASSP*, vol. 37, No. 7 (1989), pp. 1057–1071.

*Primary Examiner*—Donald E. McElheny, Jr.
*Attorney, Agent, or Firm*—Anderson, Levine & Lintel

[57] ABSTRACT

A method and system for interactively applying wavelet transform and filter operations to digital data corresponding to geological measurements is disclosed. The disclosed system and method provides the capability of applying sequences of wavelet transform filter operations to input signal datasets representative of the measurements, where the wavelet transforms can utilize different scale-wavelet function pairs within the sequence. Interactive filtering is available within each wavelet transform-filter operation, allowing either manual filtering of selected level and bands, or automatic filtering through application of a filter function. Multiple wavelet transform-filter operations may be applied to the same filtered datasets, to facilitate comparison of the various analysis techniques.

21 Claims, 10 Drawing Sheets

(2 of 12 Drawing(s) in Color)

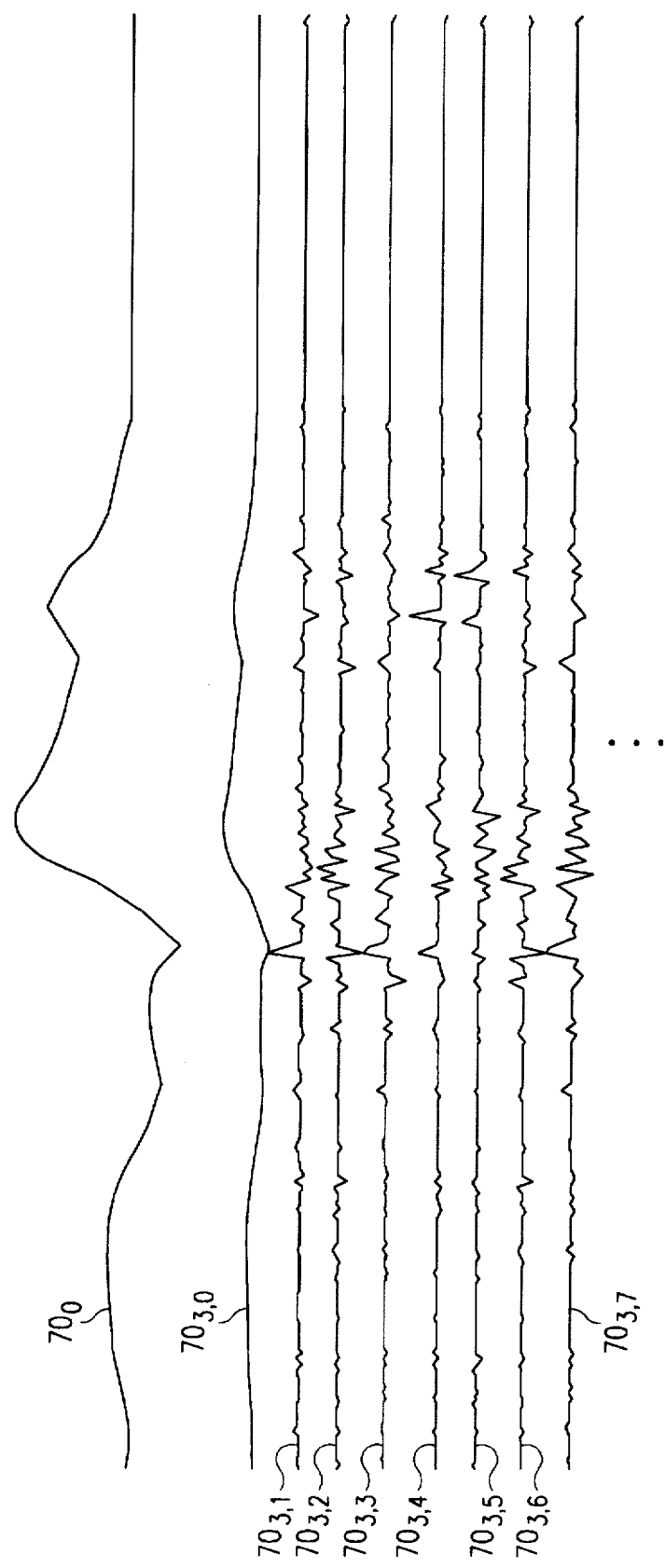

| | | | | | | | |
|---|---|---|---|---|---|---|---|
| $a_0$ | $a_1$ | $a_2$ | $a_3$ | $a_4$ | $a_5$ | $a_6$ | $a_7$ |

— LEVEL 0 (INPUT)

| $b_0$ | $b_1$ | $b_2$ | $b_3$ |
|---|---|---|---|

— LEVEL 1, BAND 0

| $b_4$ | $b_5$ | $b_6$ | $b_7$ |

— LEVEL 1, BAND 1

| $c_0$ | $c_1$ | — LEVEL 2, BAND 0
| $c_2$ | $c_3$ | — LEVEL 2, BAND 1
| $c_4$ | $c_5$ | — LEVEL 2, BAND 2
| $c_6$ | $c_7$ | — LEVEL 2, BAND 3
| $d_0$ | — LEVEL 3, BAND 0
| $d_1$ | — LEVEL 3, BAND 1
| $d_2$ | — LEVEL 3, BAND 2
| ⋮ | ⋮
| $d_7$ | — LEVEL 3, BAND 7

METHOD AND APPARATUS FOR ANALYZING GEOLOGICAL DATA USING WAVELET ANALYSIS

This application is related to copending application Ser. No. 08/419,160, filed Apr. 10, 1995, assigned to Atlantic Richfield Company, and incorporated herein by this reference.

This invention is in the field of geological exploration, and is more particularly directed to analyzing geological data by way of wavelet analysis.

BACKGROUND OF THE INVENTION

Modern oil and gas prospecting relies heavily on geological exploration in identifying the presence and location of hydrocarbon reservoirs, prior to the drilling of wells. Considering that most easily available reservoirs have already been exploited, most untapped reservoirs at this time tend to be difficult to discern from conventional geological data. For example, such reservoirs may be very deep in the earth, may be small in size, or may be difficult to detect due to overlying or adjacent formations that mask their detection by conventional geological exploration.

As a result, increasing demands are being placed upon the resolution of the analysis of geological data, such as seismic data, velocity data, variations in potential fields (i.e., gravitational and magnetic fields), and the like. Furthermore, since the cost of obtaining new survey data is also increasing, particularly for remote and inaccessible locations of the earth, successful modern oil and gas prospecting often requires the analysis of previously obtained geological data with improved resolution and efficiency. Indeed, it is contemplated that important geological structures and interfaces, including hydrocarbon reservoirs capable of production, may not be detectable through the application of conventional data processing techniques to existing survey data, but may be visible if only the appropriate filtering could be selected and applied thereto.

By way of further background, the field of wavelet analysis has recently become popular in the analysis of the time (or space) and frequency response and behavior of signals. In the general sense, wavelet analysis is concerned with performing time-frequency (or space-frequency) localization of the signal under analysis. Time-frequency localization refers to the analysis of a portion of the frequency spectrum of the input signal over a selected time window; analogously, space-frequency localization is the analysis of a portion of the frequency spectrum of a signal over a selected space-domain window.

Wavelet analysis has been used in the field of seismic prospecting, particularly in improving the resolution of seismic analysis in detecting thin or fine structures from scattered seismic data. Examples of the use of wavelet analysis in the field of seismic data processing are described in Foster, et al., "Wavelet transform methods for geophysical applications", *Expanded Abstracts with Biographies: 1994 Technical Program of the SEG International Exposition and 64th Annual Meeting* (Society of Exploration Geophysicists, Oct. 23-28, 1994), paper SP1.7, pp. 1465-68, and in Miao, et al., "Application of the wavelet transform in seismic data processing", *Expanded Abstracts with Biographies: 1994 Technical Program of the SEG International Exposition and 64th Annual Meeting* (Society of Exploration Geophysicists, Oct. 23-28, 1994), paper SP1.6, pp. 1461-64.

A typical approach in applying wavelet analysis to geological data is schematically illustrated in FIG. 1. This approach will, of course, be performed by a conventional digital computer, appropriately programmed. As shown in FIG. 1, dataset 2, consisting of geological data in the time or space domain, is applied to a wavelet transform operation 4. In wavelet transform operation 4, dataset 2 is transformed to a selected level in the continuum between the time and space domain, on one hand, and the frequency domain, on the other hand, by application of wavelet transformation thereto according to a known wavelet family. Examples of well-known wavelet families include the Daubechies wavelet (Daubechies, "Orthonormal Bases of Compactly Supported Wavelets", *Comm. Pure Appl. Math.* (1988)), the Coifman wavelet (Coifman, R. R., "Wavelet analysis and signal processing", *Signal Processing Part 1: Signal Processing Theory*, L. Ausland ed., IMA V. 22, (Springer, New York, 1990)), and B-spline wavelets (Vetterli, M., and Le Gall, D., "Perfect reconstruction FIR filter banks: some properties and and factorizations", *IEEE Trans. ASSP*, Vol. 37, No. 7, (1989), pp. 1057-1071). A filter operation 6 is then performed by applying a selected filter function $f_x$ to the transformed data; the filter function $f_x$ may be a simple high-pass, low-pass, or band-pass box filter, or may instead be a Gaussian or other more complex digital filter. Inverse transform 8 is then applied to the filtered transformed data, using the inverse of wavelet transform 4, resulting in dataset 2'. Dataset 2' thus represents a filtered version of the original geological data in the time or space domain, based upon which physical analysis of the region of the earth to which the data corresponds may be carried out.

However, as is well known in the art of wavelet analysis, many families of wavelets have been used in performing wavelet transforms, with each family of wavelets consisting of a wavelet function that may be represented by various convolutional lengths, orders, and other attributes. Many choices are thus presented to the user of wavelet analysis when selecting a wavelet for use in wavelet transform 4 of FIG. 1, for application to a particular set of signal data. The selection of a particular wavelet or wavelet family is conventionally a trial-and-error exercise, as the mathematical attributes of a particular wavelet generally cannot be correlated to a physical attribute of the signal data under analysis. Little guidance is thus available to the analyst using conventional wavelet analysis tools, thus requiring tedious application of many wavelet types to the geological data. As a result, selection of a particular wavelet or wavelet family for application to geological data will often not be optimized for purposes of analysis, but may instead be made for another reason, such as efficiency of computation.

In addition, it is similarly difficult for the analyst to select an appropriate filter function $f_x$ for use in filter operation 6 of FIG. 1. This difficulty is compounded by its application in a hybrid time-space/frequency domain to data that has been transformed by wavelet transform operation 4, as the effects of filter operation 6 upon the eventual dataset 2' will generally not be intuitive.

It is therefore an object of the present invention to provide a method and apparatus by way of which an analyst may perform trial-and-error selection of wavelet transform and filter techniques for application to geological data.

It is a further object of the present invention to provide such a method and apparatus by way of which the analyst may select a wavelet for geological data analysis that has optimum resolution.

It is a further object of the present invention to provide such a method and apparatus by way of which an analyst may use a wavelet and filter analysis sequence in which different wavelets or filter operators are applied to the same geological data in sequence.

It is a further object of the present invention to provide such a method and apparatus by way of which an analyst may readily compare the results of multiple analysis paths for the same geological data.

Other objects and advantages of the present invention will be apparent to those of ordinary skill in the art having reference to the following specification together with its drawings.

SUMMARY OF THE INVENTION

The invention may be implemented as an interactive system incorporating a digital computer, for application to geological data. The system includes an interface by way of which an analyst may select a geological dataset corresponding to measurements made to a region of the earth. A selected wavelet transform is applied to the geological dataset, with results of the transform at a selected level displayed in one of multiple fashions. A filter operation may then be applied, either by way of an explicit operation or by interactive selection of frequencies to be suppressed. Inverse transformation of the filtered data is then performed. Based upon the results of the inverse transformation, a subsequent transform and filtering operation is applied, using either the same or different wavelet transform in the same fashion. In addition, multiple wavelet transform and filter operations may be applied to the same dataset (either raw or filtered), to facilitate comparison of the results.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIGS. 6a, 6b, 6c illustrate alternative output plots of the transform results of an exemplary input signal dataset.

FIG. 7 is an example of a map of a color display, such as shown in FIG. 6c, of a transformed input signal dataset.

DETAILED DESCRIPTION OF THE PREFERRED EMBODIMENT

Figure 2:
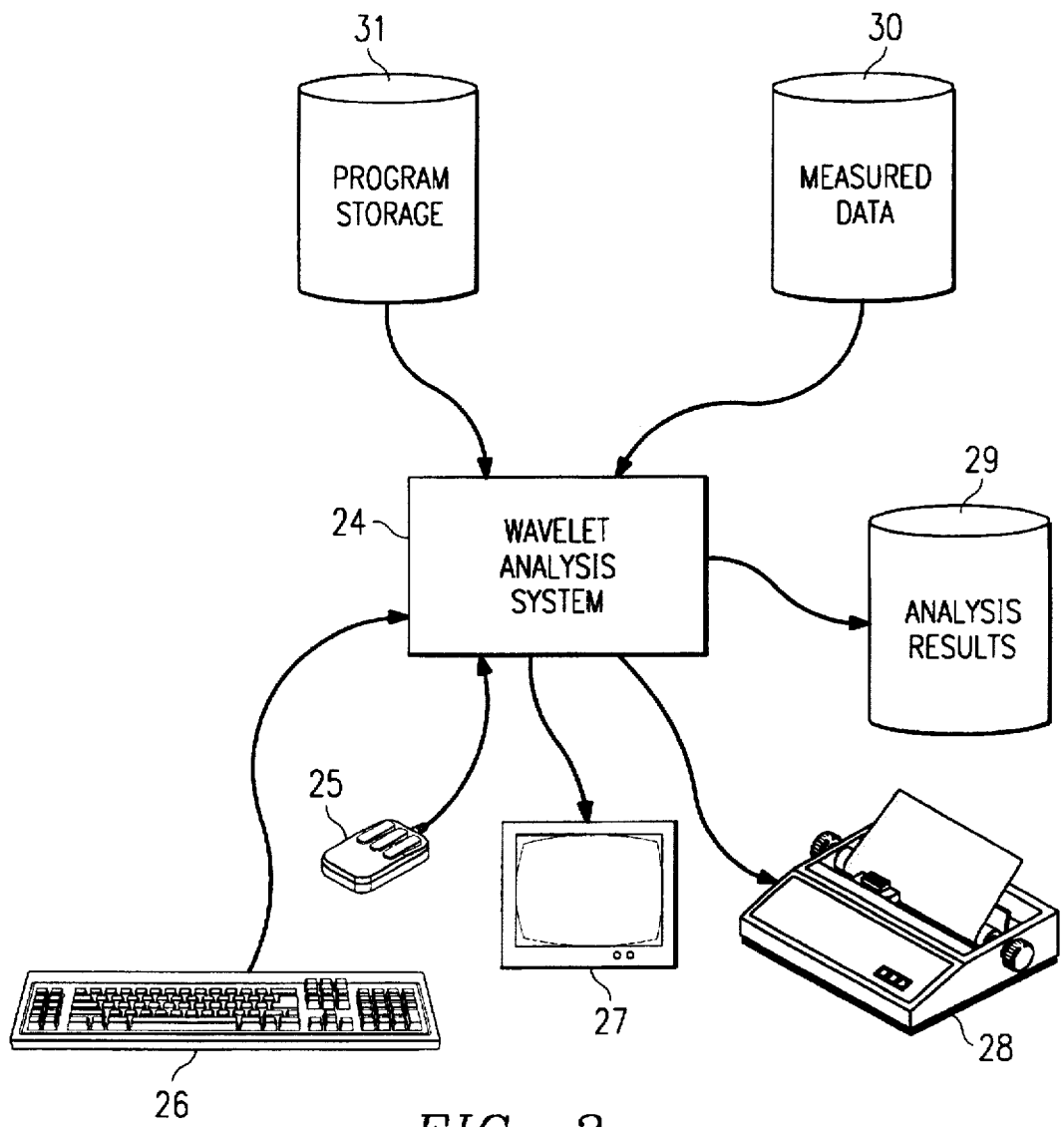
FIG. 2 is an electrical diagram, in block form, of a computer system suitable for performing the method of the preferred embodiment of the invention.

Referring now to FIG. 2, a system according to the preferred embodiment of the invention for selecting and analyzing wavelet and filter operations for use upon geological data corresponding to measurements made over a region of the earth, examples of such geological data including seismic data, velocity data, potential field measurements including either or both of gravitational field measurements and geomagnetic field measurements, and the like, will now be described. As shown in FIG. 2, the system of the preferred embodiment of the invention includes wavelet analysis system computer 24. System computer 24 may be implemented by any conventional personal computer or workstation, preferably a UNIX-based workstation such as a SPARCstation available from Sun Microsystems, Inc. System computer 24 may be implemented either in standalone fashion, or as part of a network arrangement. According to the preferred embodiment of the invention, system computer 24 presents output primarily onto graphics display 27, or alternatively via printer 28; further in the alternative, system computer 24 may store the results of the analysis described hereinbelow on disk storage 29, for later use and further analysis. Keyboard 26 and pointing device (e.g., a mouse, trackball, or the like) 25 are provided with system computer 24 to enable interactive operation.

System computer 24 is able to communicate with disk storage devices, including external hard disk storage on a network and floppy disk drives. In this embodiment of the invention, system computer 24 is able to retrieve measured geological field data from one or more disk storage device 30, according to program instructions that correspond to the method described hereinbelow and that are stored in program disk storage device 31. It is contemplated that disk storage devices 29, 30, 31 are conventional hard disk drives, and as such will be implemented by way of a local area network or by remote access. Of course, while disk storage devices 29, 30, 31, are illustrated as separate devices, a single disk storage device may of course be used to store any and all of the measurement data, as appropriate.

Figure 3:
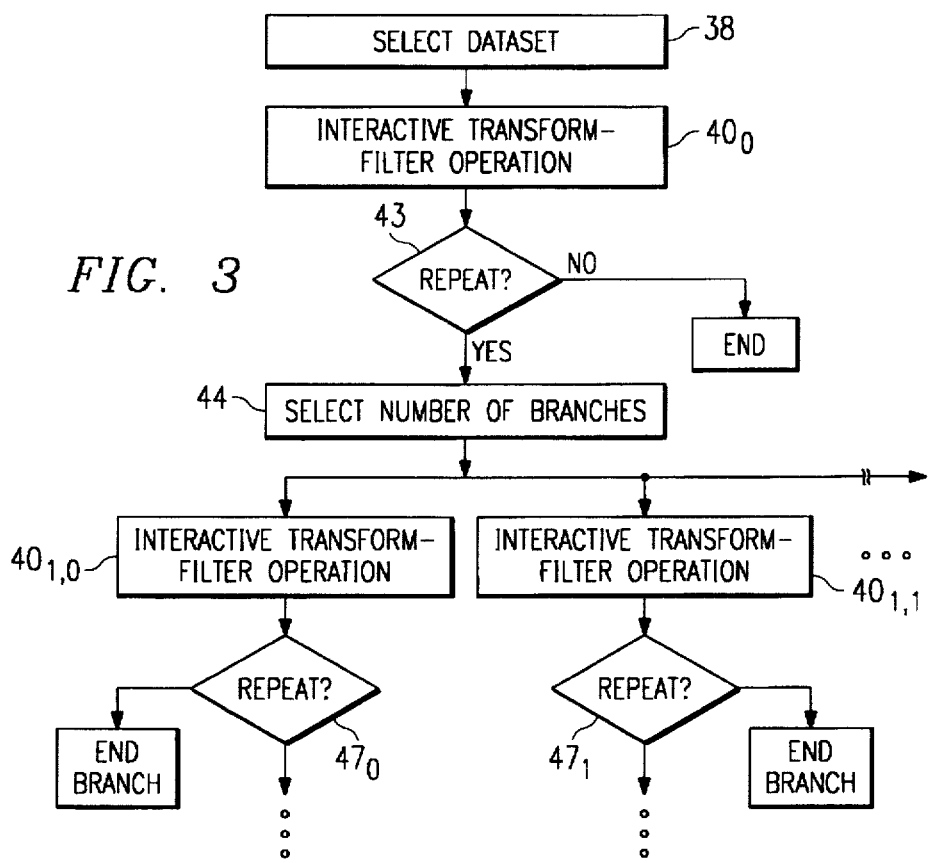
FIG. 3 is a flow chart illustrating the operation of the preferred embodiment of the invention.

Referring now to FIG. 3, a method, according to the preferred embodiment of the invention, for performing wavelet transform and filtering operations upon measured geological field data, such as seismic data, velocity data, potential field measurements including either or both of gravitational field measurements and geomagnetic field measurements, and the like, will now be described. As will be evident from the following description, this method is particularly useful in determining specific wavelet transform and filter operations that will be useful in analysis of the particular geological field data selected. For operation on system computer 24, of course, this method is written in the form of a computer program (e.g., in the C++ language or any other suitable language) and is stored in computer-readable memory, for example on program disk storage device 31 of FIG. 2; of course, the memory medium storing the computer program may be of any conventional type used for the storage of computer programs, including hard disk drives, floppy disks, CD-ROM disks, magnetic tape, and the like.

The method begins with process 38 in which the dataset to be analyzed is selected by the human analyst, and is retrieved by system computer 24 from disk storage device 30. The retrieved dataset generally corresponds to measured geological field data of a specific type, such as seismic data, velocity data, gravitational field measurements, or geomagnetic field measurements, for a particular area of the earth. The retrieved dataset corresponds to field measurements that are typically taken well prior to the application of the method of the present invention, after typical processing and noise reduction techniques have been applied to the raw measurements, as is well known in the art. The retrieved dataset will generally be a one-dimensional digital representation in the space domain, indicating the amplitude of the measurement as a function of position along a line in the survey region. The digital representation corresponds to a sampling of the measured physical attribute in the space domain, and as such will be a set of discrete magnitudes, each corresponding to a specific location along the survey region line. Of course, it is contemplated that the method according to the preferred embodiment of the invention will also be applicable to digital datasets corresponding to the survey region in two or more dimensions, but in such cases the data processing required for such multi-dimensional analysis will necessarily be more complex than that described hereinbelow, in order to contemplate the additional dimensions.

Process $40_0$ is then applied to the selected dataset; process $40_0$ includes a wavelet transform operation, a filter operation performed upon a selected level of the transformed dataset, followed by an inverse wavelet transform operation. As will be described in further detail hereinbelow, and as is evident in FIG. 3, this transform-filter operation is performed multiple times at various stages in the method according to the preferred embodiment of the invention; as such, these transform-filter operations will be referred to generally as process 40. Process 40 is preferably performed by system computer 24 in an interactive manner, such that the human analyst is able to select the particular wavelet to be applied in the transform and inverse transformation steps, and to also manually apply or select the filter operation to be performed at a selected decomposition level of the transformed dataset.

Figure 1:
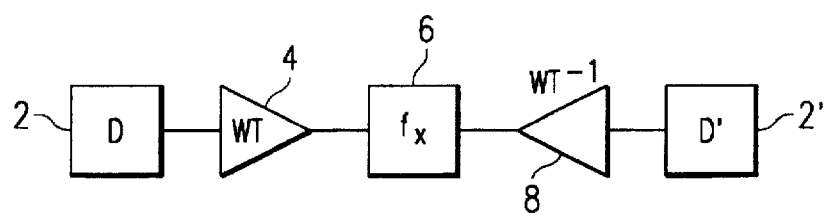
FIG. 1 is a schematic diagram illustrating a conventional wavelet transform and filtering method.
Figure 4:
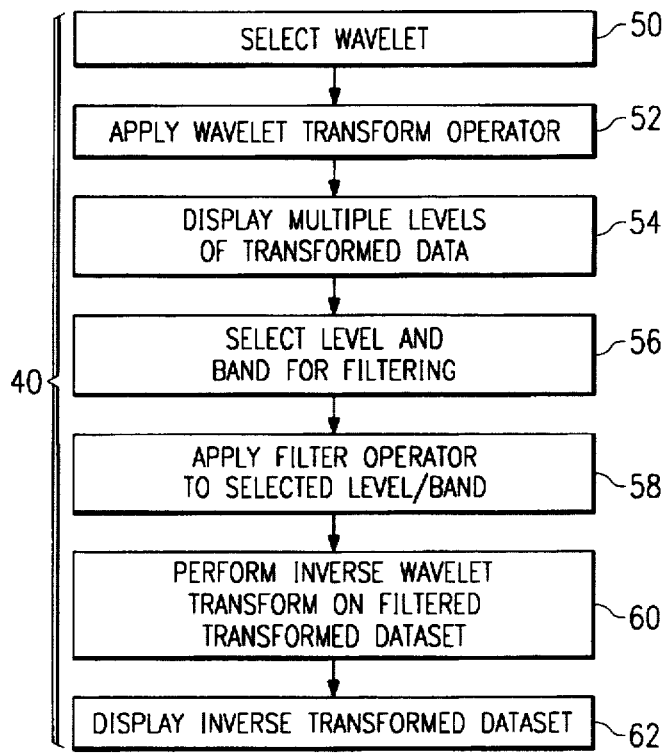
FIG. 4 is a flow chart illustrating the operation of the wavelet transform-filter operation steps of the process of FIG. 3.

Each instance of process 40 corresponds generally to a transform-filter-inverse transform operation, such as that shown in FIG. 1. However, as will be described hereinbelow, process 40 is performed in a highly interactive manner, such that the human analyst is able to select the particular wavelet function pair for use in the transform, interactively apply a filter operation, and quickly view and analyze the result of the operation. Referring now to FIG. 4, the operation of process 40 according to this embodiment of the invention will now be described in detail.

In process 40, computer system 24 fully decomposes the selected dataset into a frequency domain representation, through several levels of wavelet decomposition. As is known in the field of wavelet analysis, wavelet decomposition is performed by convolving a scale function with the input signal to generate a low-pass component (or band), and by convolving a corresponding wavelet function with the input signal to generate a high-pass component (or band). Many scale-wavelet function pairs are known in the art, as useful for time-frequency (or space-frequency) analysis, or as useful in data compression methods. Furthermore, as is known in the art, wavelet decomposition is readily performable by computers such as system computer 24, primarily by way of digital matrix operations performing decimated convolutions.

Because of the number of scale-wavelet function pairs, the performance of process 40 begins with process 50, in which the human analyst selects the scale-wavelet function pair to be applied to the selected dataset. As described in copending application Ser. No. 08/419,610, filed Apr. 10, 1995, assigned to Atlantic Richfield Company, and incorporated by reference hereinabove, a preferred function pair is the well-known Daubechies scale and wavelet functions, as described in Daubechies, "Orthonormal Bases of Compactly Supported Wavelets", *Comm. Pure Appl. Math.* (1988), pp. 909–966, incorporated herein by reference. Alternatively, other scale-wavelet function pairs may be selected in process 50, such function pairs corresponding to the well-known Coifman wavelet and the B-spline wavelets. As will be apparent hereinbelow, the present invention is especially beneficial in allowing for different scale-wavelet function pairs to be applied, either in sequence to the same dataset, or in parallel to the same dataset so that the results of the transform and filter operation provided by the different function pairs can be readily compared.

Process 52 is next performed in which the selected dataset is fully transformed, or decomposed, using the function pair selected in process 50. In the case of the Daubechies scale-wavelet function pair, the transform or decomposition of process 52 effectively uses quadrature mirror low-pass and high-pass filters that decompose the input signal by decimated convolutions. Mathematically, a discrete input signal function f may be expressed as the sum of a coefficient sequence $c_n^0$ convolved with the Daubechies scaling function $\phi_{0,n}$ as follows:

$$f \equiv \Sigma_n c_n^0 \phi_{0,n} \quad (1)$$

First level decomposition of this discrete input function f provides a low-pass coefficient sequence $c^1_n$ and a high-pass coefficient sequence $d^1_n$ as follows:

$$\Sigma_n c_n^0 = \Sigma_n \{c_n^1 \phi_{1,n} + d_n^1 \psi_{1,n}\} \quad (2)$$

where $\phi$ and $\psi$ are the Daubechies scale and wavelet functions, respectively. As is known in the art, the Daubechies scale and wavelet functions are not expressible as explicit formulae, but instead are readily representable in matrix form for application in convolutional filters. See Daubechies, "Orthonormal Bases of Compactly Supported Wavelets", *Comm. Pure Appl. Math.* (1988), at p. 980.

Figure 5:
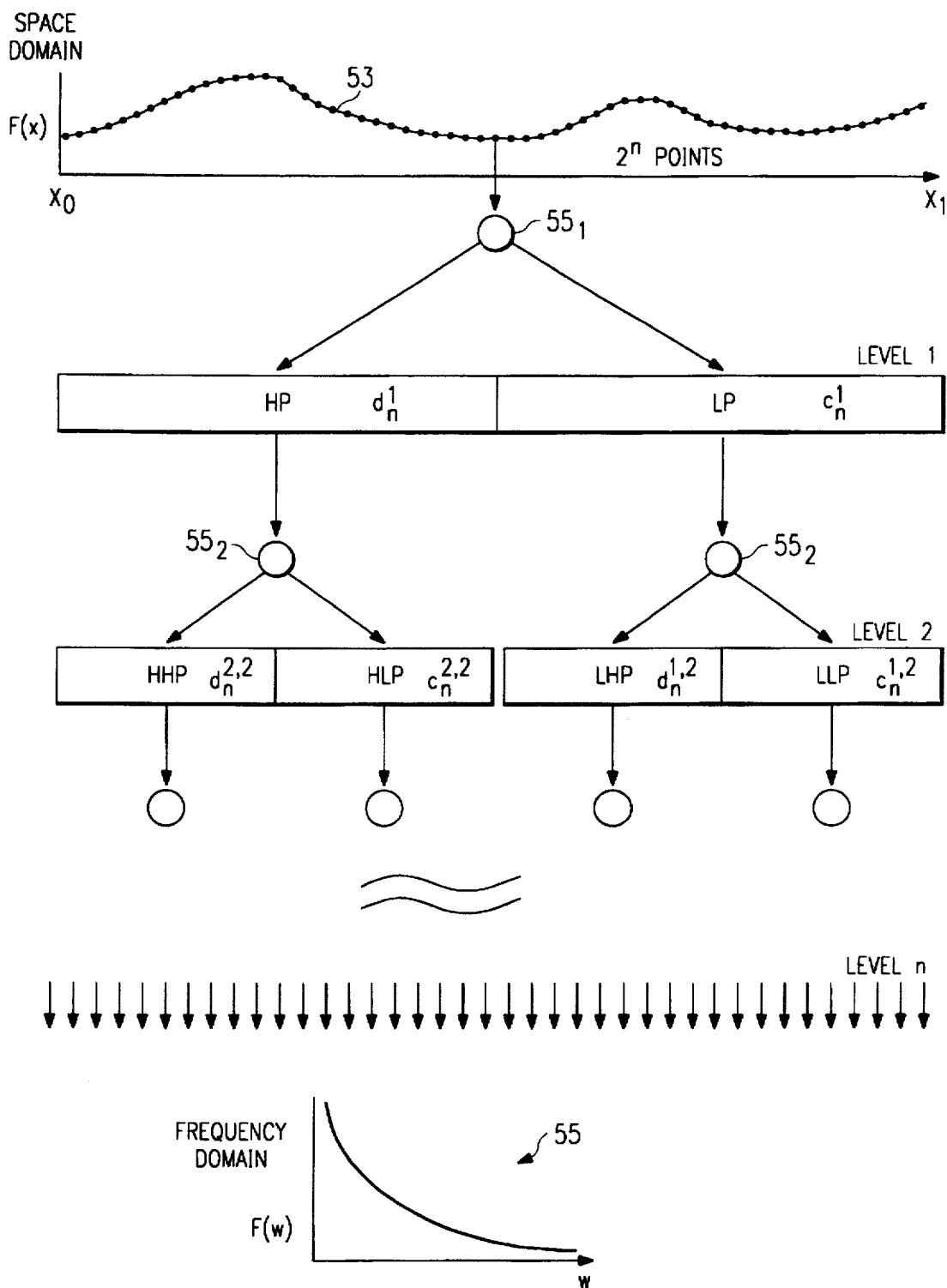
FIG. 5 is a schematic diagram illustrating wavelet decomposition of a space domain function.

Referring to FIG. 5, a schematic example of wavelet decomposition as performed in process 52 is illustrated. Input signal 53 in this example is a one-dimensional discrete function F(x) in the space domain, having a magnitude value corresponding to each of $2^n$ points in the x-dimension; as such, input signal 53 of FIG. 5 corresponds to the digital dataset retrieved in process 38 of FIG. 3.

First level decomposition is indicated by operator $55_1$ of FIG. 5, in which the selected scale function is convolved with input signal dataset 53 to produce a low-pass component or band (LP), and in which its corresponding wavelet function is convolved with input signal dataset 53 to produce a high-pass component or band (HP). As is well known in the art, the number of discrete values contained in each of the low-pass band LP and high-pass band HP contain one-half as many discrete points as contained in input signal dataset 53. The sum total of discrete points after first level (and any level) decomposition is the same as that presented by input signal dataset 53.

According to the preferred embodiment of the invention, the wavelet decomposition continues by the repeated application of the convolutional filters (shown, for the second level, as operators $55_2$) to the components resulting from a prior level, further decomposing the decomposition results in each additional level. The transform operation is completed, for an input signal dataset 53 consisting of $2^n$ discrete values, upon the decomposition reaching level n. The result of the completed transform operation is power spectrum 55, which is in the frequency domain. Power spectrum 55 effectively consists of n bands, each having one value therein. In other words, upon completion of process 52, space-domain input signal dataset F(x) will have been fully transformed into a frequency domain signal representation $\Im(\omega)$.

System computer 24 then, according to this embodiment of the invention, preferably displays the results of the transform of process 52, displaying each of the bands of each of the levels between the space domain and frequency domain representations on graphics display 27. According to the preferred embodiment of the invention, multiple modes of displaying the transform results are available, each of which will now be described in detail.

FIG. 6a illustrates the transform results of an exemplary input signal dataset $70_0$ decomposed into the level using the Daubechies wavelet function pairs, and displayed in the form of "wiggle" traces. In these wiggle traces, each of the bands $70_{m,n}$ of the decomposition is spread out over the full length of the input signal dataset $70_0$, so as to somewhat illustrate the spatial relationship of the specific values of the decomposition in bands $70_{m,n}$ to that of the input signal $70_0$. In the example of FIG. 6a, the third level of decomposition is illustrated (i.e., the first and second levels are not shown); as such, FIG. 6a shows the eight bands $70_{3,0}$ through $70_{3,7}$ that result from the third level of decomposition ($2^3=8$).

Figure 6B:
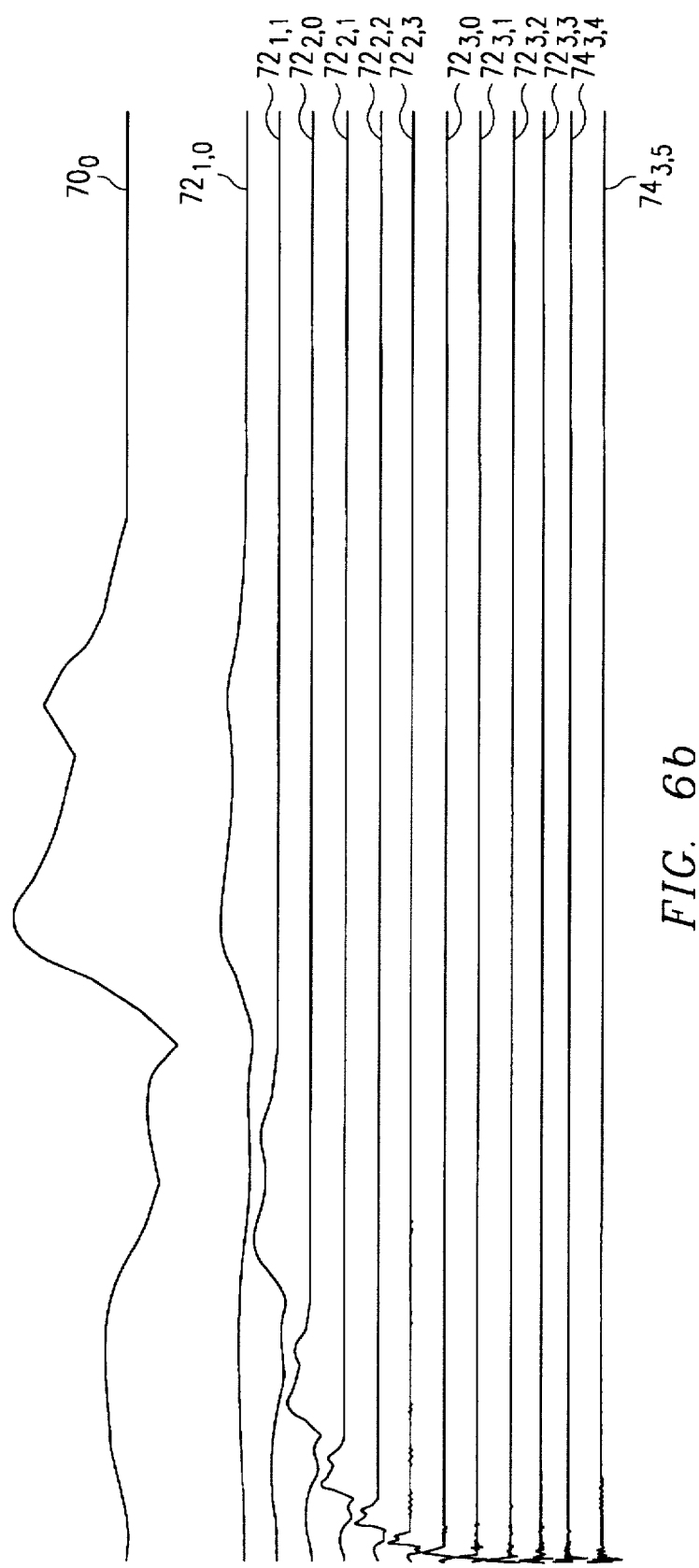

FIG. 6b illustrates the transform results of the exemplary input signal dataset shown in FIG. 6a, decomposed into the third level and using the Daubechies wavelet function pairs, but displayed in the alternative form of "tree" traces $72_{m,n}$. In these tree traces $72_{m,n}$, the bands of the decomposition are displayed point-by-point from the left-hand origin, so that the number of discrete points in each band $72_{m,n}$ is apparent from the length of the portion of the corresponding trace that has varying values. In the example of FIG. 6b, bands 72 from all three of the first, second and third levels of decomposition are illustrated (less the highest frequency bands $72_{3,6}$, $72_{3,7}$ from the third level).

Figure 6C:
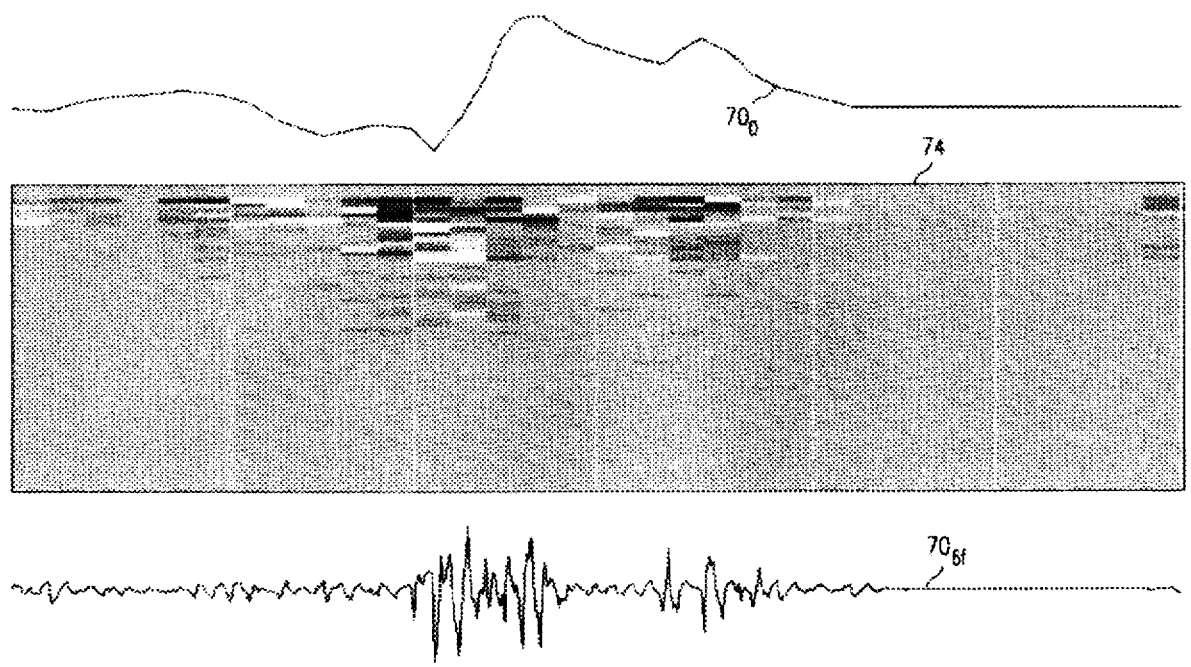

FIG. 6c also illustrates the transform results of the exemplary input signal dataset $70_0$ shown in FIGS. 6a and 6b, decomposed into the sixth level using the Daubechies wavelet function pairs, displayed in a color graphics form as display 74. The color of each individual block within display 74 corresponds to the magnitude of that discrete value in its corresponding band. The color display version of FIG. 6c is most beneficial in facilitating the manual post-transform filtering of a particular level and band, as will be described hereinbelow. FIG. 6c also shows trace $70_{6f}$ which corresponds to the sixth level of decomposition after post-transform filtering, as will be described in further detail hereinbelow.

The position of particular color blocks in the display of FIG. 6c corresponds to the band within a selected level in the transform process. FIG. 7 is a map of an exemplary color display 74 of a transformed input signal dataset. For purposes of explanation, the input data signal of FIG. 7 has only eight discrete data points, which is much smaller than typical input data signals to which the present embodiment of the invention is applied, sizes of which are typically on the order of 512 points or greater.

As illustrated in FIG. 7, "Level 0" decomposition corresponds to the input signal dataset itself in the space domain, and thus contains eight values $a_0$ through $a_7$ in a single row, since the space domains corresponds to a single frequency "band". This Level 0 decomposition thus corresponds to the discrete form of input signal waveform $70_0$ illustrated in FIGS. 6a through 6c.

Level 1 decomposition results in two frequency bands, a low-frequency band and a high frequency band, shown in FIG. 7 as "Level 1, Band 0", and "Level 1, Band 1", respectively. In this example, Level 1, Band 0 contains four values, $b_0$ through $b_3$, and corresponds to tree display trace $72_{1,0}$ of FIG. 6b; Level 1, Band 1 similarly contains four values in this example, namely $b_4$ through $b_7$, and corresponds to tree display trace $72_{1,1}$ of FIG. 6b. In each decomposition, the number of discrete values provided by the combination of both bands is eight, the same as the input signal data set. Also as shown in FIG. 7, level 2 decomposition provides four bands ("Level 2, Band 0" through "Level 2, Band 3", corresponding to traces $72_{2,0}$ through $72_{2,3}$. Each of these bands from the second level of decomposition is, in this example, displayed by its two values c in a row of the display of FIG. 7; again, the number of discrete values generated in the four bands of level 2 equals the number of discrete values in the input signal dataset.

The decomposition of the input signal dataset in the example of FIG. 7 is complete in the third level, since eight discrete values were present in the input signal dataset. Level 3 decomposition thus results in eight bands, each with a single discrete value d (displayed in its own row), thus corresponding to a frequency domain representation of the input signal dataset since, in the frequency domain, each discrete value corresponds to its own frequency "band". Accordingly, bands $d_0$ through $d_7$ of FIG. 7 correspond to traces $70_{3,0}$ through $70_{3,7}$ of FIG. 6a, respectively; bands $d_0$ through $d_5$ of FIG. 7 correspond to traces $72_{3,0}$ through $72_{3,5}$ of FIG. 6b, respectively (bands $72_{3,6}$, $72_{3,7}$ not being shown in FIG. 6b).

As shown by way of exemplary color display 74 of FIG. 6c, each of the discrete values $a_0$ through $a_7$, $b_0$ through $b_7$, $c_0$ through $c_7$, $d_0$ through $d_7$, is displayed as a color, with the color hue corresponding to a magnitude value. As will be apparent from the following description, this display mechanism facilitates the manual filtering of the transformed input data signal.

Referring back to FIG. 4, upon display of the transformed input signal data set in process 54, the human analyst interactively selects, in process 56, a level and band of the decomposition to which a filter operation will be applied. This selection may be made simply by directing a cursor to the selected level and band of the display, and clicking thereat, by way of pointing device 25; of course, such selection may alternatively be made by way of keystrokes or other known techniques. It is contemplated that several bands may be selected for filtering within a specific level, but that filtering will generally be applied to a single level of the decomposition.

After selection of the desired level and band, process 58 is next performed by way of which filtering may be applied to the selected level and band of the transformed, or decomposed, input signal dataset. In the interactive system of this preferred embodiment of the invention, it is contemplated that this filtering will be typically performed by "zeroing" the magnitude of selected discrete values in the selected level and band(s). This type of filtering is expected to be especially useful in eliminating higher frequency noise artifacts from the decomposition. For the example of FIGS. 6c and 7, where the decomposition is displayed as colors, such zeroing may be performed simply by directing a cursor to the selected discrete value by way of pointing device 25, and clicking thereat to indicate that the selected discrete value is to be zeroed. In the wiggle and tree traces of FIGS. 6a, 6b, other techniques, such as "dragging" a half cycle of the displayed amplitude to zero, may be used.

Further in the alternative, the filtering operation of process 58 may be the application of a selected filter operator to the selected level and band. For example, a Gaussian filter operator of a selected center frequency may be applied to the selected level and band. In this case, the human analyst would not select discrete values of the selected level and band for filtering, but the filter function would be applied to the entire band, such as by way of point-by-point multiplication of the discrete values with the filter function.

As is evident from the foregoing description, it is a particular benefit of the present invention that the selection and application of the filter operator, or of manual filtering by zeroing, in process 58 is left to the judgment of the human analyst, such judgment generally based upon the displayed results of the decomposition. As will become especially apparent from the following description, the preferred embodiment of the present invention thus provides the analyst with a tool for interactively viewing the results of specific filter operations, and for comparing different filter operations and transforms with one another.

Following filtering process 58, process 60 is next performed by system computer 24 in performing the inverse transform of the filtered transformed dataset, to recover a space-domain signal therefrom. Process 60 will, of course, use the same scale-wavelet function pair as used in the decomposition or transformation of process 52. The inverse transformation will be performed in the conventional manner, well-known in the field of wavelet analysis.

Process 62 is next performed, in which the space-domain representation resulting from the inverse transformation of process 60 is displayed. Referring briefly to FIG. 1, the result displayed by process 62 corresponds to dataset D', in the case where dataset D corresponds to the input signal dataset applied to process 40. The display of this space-domain representation, as performed in process 62, may be in the same or in a separate "window" of graphics display 27. For example, referring to FIG. 6c, the filtered space-domain representation may be displayed in the same window as the input space-domain signal and various decomposition products. In this example, trace $70_{6f}$ corresponds to the inverse transform of the results of the sixth decomposition level where the second band (i.e., the second-most low frequency decomposition band) in the sixth level has been "zeroed" in process 58.

Alternatively, display of the filtered space-domain representation may be presented within the same graphical display window as that in which the decomposition results were presented in process 54. Indeed, for purposes of analysis of the filter operation, two windows may be simultaneously displayed, one for which no filter was applied to the transformed dataset in process 58, and one for which such filtering was performed.

Upon the display presented by process 62, process 40 is complete; in the example described relative to FIG. 3, this completes process $40_0$, which is the initial transform-filter operation upon the input signal dataset selected by process 38. Decision 43 is next performed in which the human analyst is queried as to whether another transform-filter operation 40 is to be applied to the results of process $40_0$; if not, the process of course ends. As will be evident from the following description, the results of process $40_0$ just completed may be retained, for comparison with another iteration of process $40_0$ applied to the same input signal dataset but using either or both a different wavelet function pair and a different filter operation (either different filtering, or similar filtering to different levels or bands, or both).

The preferred embodiment of the present invention, however, provides the capability of applying successive transform-filter operations 40 to the results of preceding transform-filter operations, so that geological structures and interfaces that may be otherwise hidden from view according to conventional analysis techniques may be discovered. As such, the human analyst may decide, in decision 43, that additional transform-filter operations 40 are to be performed.

In this case, process 44 is next performed according to the preferred embodiment of the invention, in which the number of "branches" of the additional transform is selected by the human analyst. The number of branches so selected may be one or more, depending upon the trial-and-error approach desired by the human analyst. For purposes of this description, a branch refers to at least one transform-filter operation 40 performed upon the same dataset (which in this case corresponds to the results of process $40_0$) as which another transform-filter operation 40 is performed. Each branch may, of course, contain a sequence of multiple transform-filter operations 40, as desired by the human analyst. The use of multiple branches facilitates comparison of the results of different transform-filter techniques (i.e., different selections of wavelet function pairs, filter operations, or both), so that the human analyst can optimize the analysis approach to be applied to the particular geological measurements to which the dataset corresponds.

Therefore, for each branch selected in process 44, another transform-filter operation 40 will be performed, in the manner described hereinabove, upon the results of transform-filter operation $40_0$ previously generated. Two such branches are illustrated in FIG. 3, in which transform-filter operations $40_{1,0}$ and $40_{1,1}$ are illustrated. Transform-filter operations $40_{1,0}$ and $40_{1,1}$ will differ from one another not in the input data applied thereto (which in each case are the results of transform-filter operation $40_0$), but in either the wavelet function pair or filter operation utilized therein.

Figure 8:
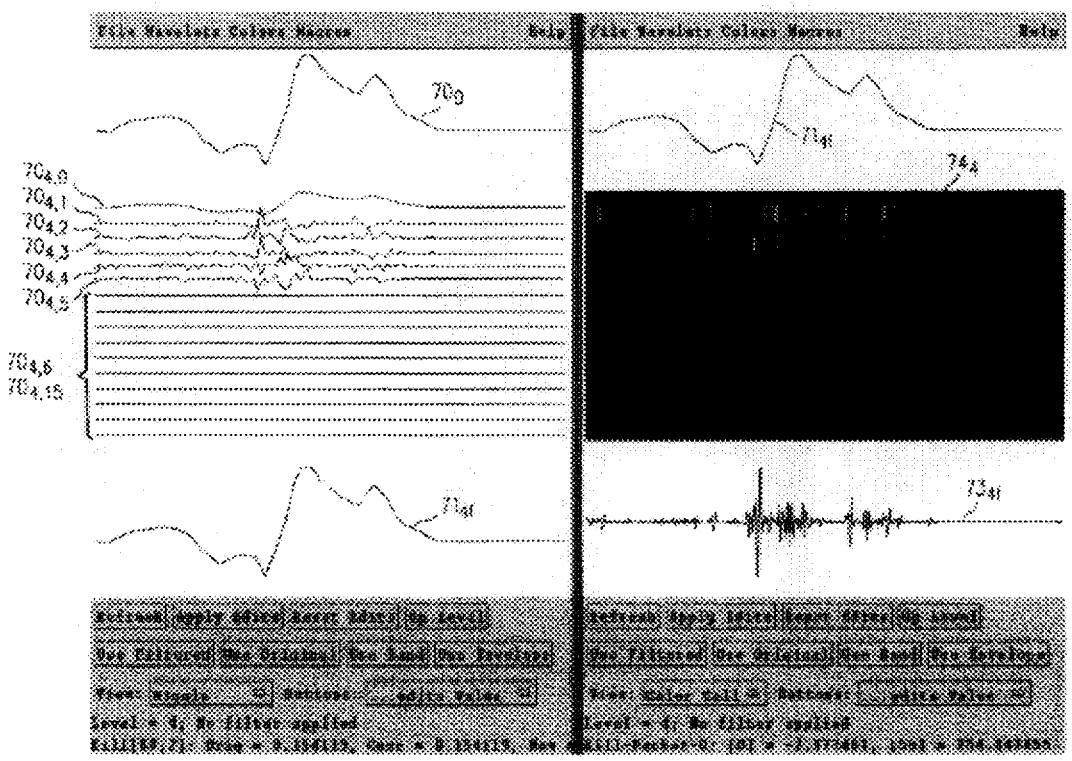
FIGS. 8 and 9 illustrate exemplary displays of results from second level transform-filter operations, performed according to the preferred embodiment of the invention.

The results of transform-filter operations $40_{1,0}$ and $40_{1,1}$ may be simultaneously displayed by system computer 24 on graphics display 27, for ease of comparison. FIG. 8 illustrates exemplary windows showing the results of subsequent transform-filter operations $40_{1,0}$ and $40_{1,1}$, each based upon the results of transform-filter operation $40_0$.

In the left-hand window of FIG. 8, input signal waveform $70_0$ is illustrated at the top of the window. Input signal waveform $70_0$ may be the results of a prior transform-filter operation $40_0$, or alternatively may be an initial input signal waveform. In this example, transform filter operation $40_{1,0}$ is performed upon input signal waveform $70_0$ to the fourth level, and as such the display (in wiggle form) illustrates sixteen traces $70_{4,0}$ through $70_{4,15}$. The filter operation of process 58, described hereinabove, is applied in this example to "zero" the contribution of the higher frequency decomposition results $70_{4,7}$ through $70_{4,15}$, as shown in the left-hand window of FIG. 8. Trace $71_{4f}$ is then generated by performing the inverse wavelet transform of the decomposition results $70_{4,0}$ through $70_{4,15}$, where the higher frequency decomposition results $70_{4,7}$ through $70_{4,15}$ are zeroed. As is evident from FIG. 8, output filtered trace $71_{4f}$ is very similar to the input signal waveform $70_0$; this is expected, given that little high frequency activity is present in input signal waveform $70_0$.

The right-hand window of FIG. 8 illustrates a comparative transform-filter operation $40_{1,1}$ (as shown in FIG. 3), performed upon the same input signal waveform $70_0$ as applied to transform-filter operation $40_{1,0}$. As such, input signal waveform $70_0$ is displayed at the top of the right-hand window of FIG. 8. Transform-filter operation $40_{1,1}$ in this example also performs wavelet decomposition of input signal waveform $70_0$ to the fourth level, but in this case illustrates the results as color display $74_4$ as shown in FIG. 8. Transform-filter operation $40_{1,1}$ utilizes a different zeroing filter than used in Transform-filter operation $40_{1,0}$, however; in this example, transform-filter operation $40_{1,1}$ zeroes the lowest frequency band (i.e., the $0^{th}$ band) of the fourth level decomposition results. Output trace $71*_{4f}$ is then generated and displayed at the bottom of the right-hand window of FIG. 8, for comparison with output trace $71_{4f}$ in the left-hand window. In this example, since the low frequency contribution has been zeroed, output trace $71^*_{4f}$ is substantially limited to higher frequency behavior than remains in output trace $71_{4f}$.

As is evident from FIG. 8, the present invention readily provides the human analyst with the ability to readily compare the results from two different transform-filter operations upon the same input data signal (either directly input or the results of a prior transform-filter operation). The human analyst can thus readily try and compare different transform and filter sequences to one another in the attempt to develop a robust transform-filter sequence useful in the analysis of geological data and measurements.

Figure 9:
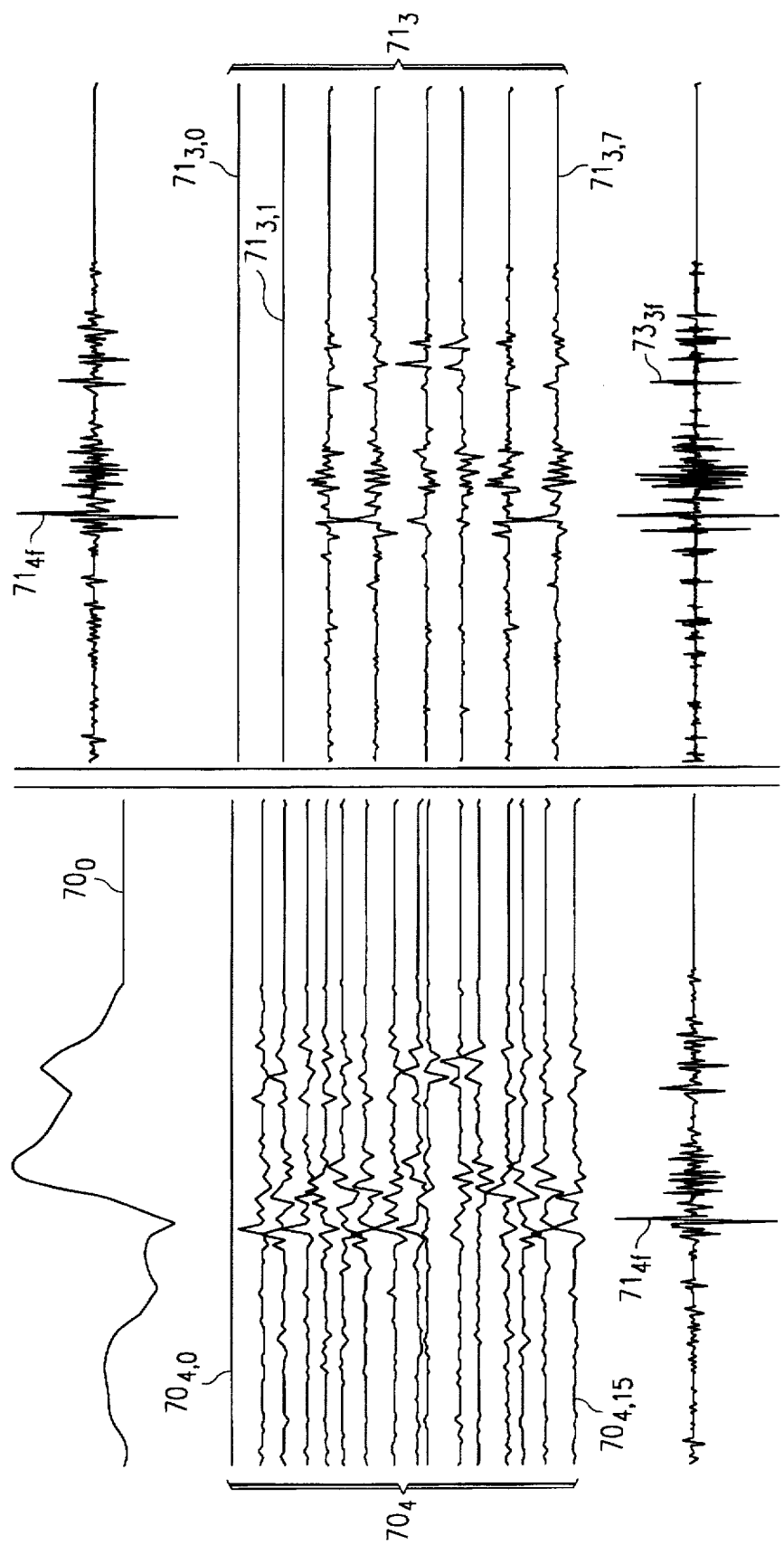

In this example, each of transform-filter operations $40_{1,0}$ and $40_{1,1}$ are followed, in their respective branches by a decision block $47_0$, $47_1$, respectively, in which a similar decision is made as in the case of decision 43 described hereinabove. The results of successive transform-filter operations in the same branch may also be simultaneously viewed in different windows on the same display. FIG. 9 illustrates an example of such simultaneous display for an exemplary input signal and transform-filter sequence, as will now be described.

In FIG. 9, input signal waveform $70_0$, illustrated at the top of the left-hand window, again may be the results of a prior transform-filter operation $40_0$, or alternatively may be an initial input signal waveform. In this example, transform-filter operation $40_{1,0}$ is performed upon input signal waveform $70_0$ to the fourth level, and as such the display (in wiggle form) illustrates sixteen traces $70_{4,0}$ through $70_{4,15}$. In this example, however, the filter operation of process 58 "zeroes" the contribution of the lowest frequency decomposition result $70_{4,0}$, as shown in the left-hand window of FIG. 9. Trace $71_{4f}$ is again generated by performing the inverse wavelet transform of the decomposition results $70_{4,0}$ through $70_{4,15}$, where the lowest frequency decomposition result $70_{4,0}$ is zeroed, in this case. As is evident from FIG. 8, output filtered trace $71_{4f}$ consists primarily of high frequency activity, since the lowest frequency band has been zeroed.

The right-hand window of FIG. 9 illustrates, in this case, the next successive transform-filter operation $40_{2,0}$ applied to the results (trace $71_{4f}$) of transform-filter operation $40_{1,0}$. Accordingly, signal trace $71_{4f}$ is displayed at the top of the right-hand window of FIG. 9. Transform-filter operation $40_{2,0}$ is then applied to decompose signal trace $71_{4f}$ to the third level in this example, resulting in eight traces $71_{3,0}$ through $71_{3,7}$. Filter process 58, in this example, zeroes the two lowest frequency bands $71_{3,0}$, $71_{3,1}$ of the third level decomposition. Following inverse transformation, output trace $73_{3f}$ is then displayed at the bottom of the right-hand window of FIG. 9.

As illustrated by the example of FIG. 9, the present invention thus provides the ability for the human analyst to view multiple iterations of transform-filter operations 40 upon an input signal, including iterations for which either the transform or the filter operation differ between successive iterations. In addition, computer system 24 may also allow interactive operation of successive transform-filter operations. For example, in FIG. 9, the human analyst may interactively change the filter applied to the left-hand window decomposition results (e.g., by zeroing another band of the decomposition results); computer system 24 may then apply the new filter operation to generate a new trace $71_{4f}$ and new results in the right-hand window (resulting from the changes to the output from the first iteration). The human analyst may thus perform interactive "what-if" analysis in developing a transform-filter sequence to be applied to actual data.

Referring back to FIG. 3, if no additional transform-filter operations 40 are to be performed for a particular branch, that branch will then end, while further analysis may be carried out as desired for other branches. The process then continues in the same manner, until no more transform-filter operations 40 are to be performed for any branch. The process is complete at that point.

As is evident from the foregoing description, a highly interactive approach to wavelet analysis of geological measurement datasets may be developed and experimentally altered by the human analyst, resulting in as complex a system as desired. For example, use of the preferred embodiment of the invention may result in a standard wavelet-filter approach that is optimized for measured geological data of a specific type. Attention is directed in this regard to copending application Ser. No. 08/419,160, filed Apr. 10, 1995, assigned to Atlantic Richfield Company, and incorporated herein by reference, which describes such an optimized analysis approach for potential field measurements. The approach described in that copending application was obtained through application of the method of the preferred embodiment of the invention. As described therein, once such an approach is defined, it may be applied in a batch processing mode to similar datasets from other survey regions, without requiring the interactive application of a human analyst.

Figure 10:
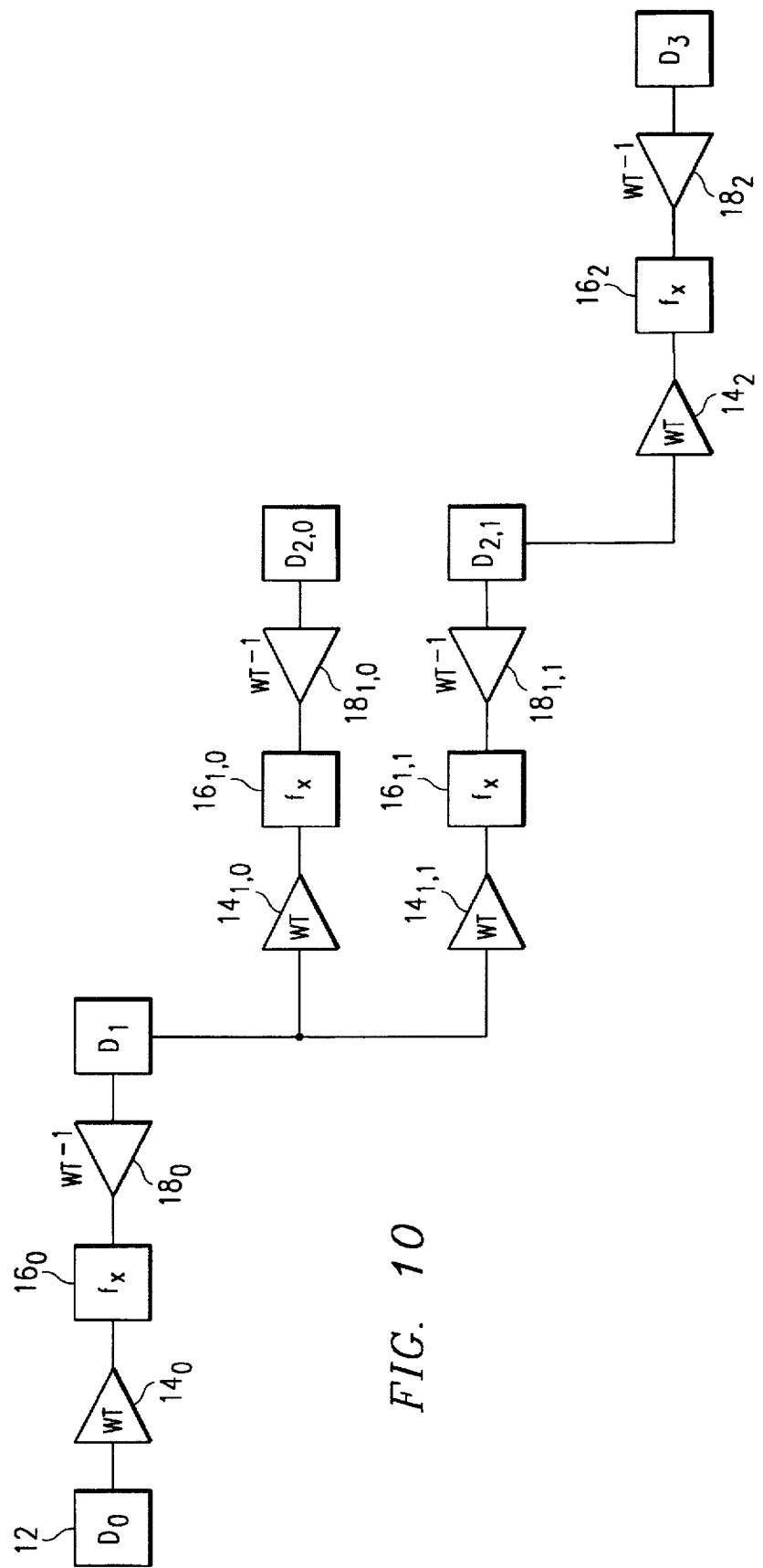
FIG. 10 is a schematic diagram illustrating an example of the application of the wavelet transform and filtering method according to the preferred embodiment of the invention.

Referring now to FIG. 10, an example of a branched sequence of wavelet transform and filter operations applied to a dataset is illustrated through use of system computer 24, shown in operator form similar as that shown in FIG. 1. In FIG. 10, the input signal dataset $D_0$, which corresponds to actual geological measurements for a selected region of the earth, is applied to a first wavelet transform operator $14_0$ which uses a selected scale-wavelet function pair. The results of wavelet transform operator $14_0$ are then filtered by filter operator $16_0$, done either through manual filtering by the human operator or by the automated application of a filter function as described hereinabove. The results of the filter operation $16_0$ are then inverse transformed via inverse wavelet transform operator $18_0$ (which of course uses the same wavelet function pair as transform operator $14_0$), resulting in first level filtered dataset $D_1$.

In the example of FIG. 10, first level filtered dataset $D_1$ is then further processed by way of two branches. In a first branch, wavelet transform operator $14_{1,0}$ is applied to dataset $D_1$, followed by filter operator $16_{1,0}$ and inverse wavelet transform $18_{1,0}$ to produce second level filtered dataset $D_{2,0}$. Similarly, a second branch applies wavelet transform operator $14_{1,1}$ to dataset $D_1$, followed by filter operator $16_{1,1}$ and inverse wavelet transform $18_{1,1}$ to produce second level filtered dataset $D_{2,1}$. The two branches differ from one another either through use of a different wavelet function pair in transform operators $14_{1,0}$, $14_{1,1}$ relative to one another (and, of course, in the corresponding inverse wavelet transforms $18_{1,0}$, $18_{1,1}$), or through use of different filter operations $16_{1,0}$, $16_{1,1}$, or both. Furthermore, the wavelet transform operators $14_{1,0}$, $14_{1,1}$ may either or both differ from the first level wavelet transform $14_0$, through use of a different wavelet function pair; similarly, either or both of filter operations $16_{1,0}$, $16_{1,1}$, may differ from filter operation $16_0$ in the first level. In any case, the human analyst can then compare the resulting datasets $D_{2,0}$, $D_{2,1}$ with one another, to determine which provides more, or more accurate, information.

In the example of FIG. 10, the human analyst determined that second level filtered dataset $D_{2,1}$ required additional analysis through another transform-filter operation. As such, wavelet transform operator $14_2$ is applied to second level filtered dataset $D_{2,1}$, using either the same or different wavelet function pairs as those previously used. Filter operator $16_2$ is then applied to the results of wavelet transform operation $14_2$, using either a similar or different filter approach as previously used; this is of course followed by inverse wavelet transform operator $18_2$, resulting in third level filtered dataset $D_3$. The process of this example is then completed, allowing the human analyst to compare the results of the various filtered datasets $D_1$, $D_{2,0}$, $D_{2,1}$, $D_3$ with one another, and to input signal dataset $D_0$.

The present invention thus provides excellent capabilities to the human analyst of geological measurements, particularly in allowing selection and optimization of the important, but complex and non-intuitive, wavelet function pairs to such measurements, along with filter operations. The present invention thus is important in the development of powerful but complex analysis techniques in the field of oil and gas prospecting.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a computer to analyze geological measurements taken at a survey region of the earth, comprising:

retrieving, from memory, an input signal dataset corresponding to a discrete space-domain representation of geological measurements over a selected portion of the survey region;

performing an initial wavelet transform-filter operation upon the input signal dataset to produce a first-level filtered dataset, wherein the initial wavelet transform-filter operation comprises a wavelet transform of the input signal dataset, a filter operation upon the results of the wavelet transform, and an inverse transform upon the results of the filter operation to produce the first-level filtered dataset;

performing a first wavelet transform-filter operation upon the first-level filtered dataset, comprising the steps of:
  selecting a first scale-wavelet function pair for application to the first-level filtered dataset;
  transforming the first-level filtered dataset by applying the selected first scale-wavelet function pair to the first-level filtered dataset;
  then filtering results of the transforming step using a first selected filter; and
  then inverse-transforming results of the filtering step, by applying the selected first scale-wavelet function pair thereto, to produce a first second-level filtered dataset; and displaying the first second-level filtered dataset.

2. The method of claim 1, wherein the initial wavelet transform-filter operation applies, to the input signal dataset, a scale-wavelet function pair that is different from the first scale-wavelet function pair.

3. The method of claim 2, wherein the filter operation of the initial wavelet transform-filter operation applies a filter that is different from the first selected filter.

4. The method of claim 1, further comprising:
performing a second wavelet transform-filter operation upon the first-level filtered dataset, comprising the steps of:
  selecting a second scale-wavelet function pair for application to the first-level filtered dataset;
  transforming the first-level filtered dataset by applying the selected second scale-wavelet function pair to the first-level filtered dataset;
  then filtering results of the transforming step using a second selected filter; and
  then inverse-transforming results of the filtering step, by applying the selected second scale-wavelet function pair thereto, to produce a second second-level filtered dataset; and displaying the second second-level filtered dataset.

5. The method of claim 4, wherein the steps of displaying the first and second second-level filtered datasets are performed simultaneously.

6. The method of claim 4, wherein the first and second scale-wavelet functions differ from one another.

7. The method of claim 6, wherein the first and second selected filters differ from one another.

8. The method of claim 4, wherein the first and second selected filters differ from one another.

9. The method of claim 4, further comprising:
performing a third wavelet transform-filter operation upon the first second-level filtered dataset, comprising the steps of:
  selecting a third scale-wavelet function pair for application to the first second-level filtered dataset;
  transforming the first second-level filtered dataset by applying the selected third scale-wavelet function pair to the first second-level filtered dataset;
  then filtering results of the transforming step using a third selected filter; and
  then inverse-transforming results of the filtering step, by applying the selected third scale-wavelet function pair thereto, to produce a third-level filtered dataset; and displaying the third-level filtered dataset.

10. The method of claim 9, wherein the first and third scale-wavelet functions differ from one another.

11. The method of claim 10, wherein the first and third selected filters differ from one another.

12. The method of claim 9, wherein the first and third selected filters differ from one another.

13. The method of claim 1, wherein the geological measurements correspond to potential field measurements taken at a plurality of surface locations in the survey region.

14. The method of claim 13, wherein the potential field measurements comprise measurements of the magnetic field at selected locations in the survey region.

15. The method of claim 13, wherein the potential field measurements comprise measurements of the gravitational field at selected locations in the survey region.

16. A digital computing system for analyzing geological measurements taken at a survey region of the earth, comprising:

a memory for storing data corresponding to a discrete space-domain representation of geological measurements over the survey region;

a graphics display output device; and a programmed computer, coupled to the memory and to the output device, for:
  retrieving, from the memory, an input signal dataset corresponding to the discrete space-domain representation of geological measurements over a selected portion of the survey region;

performing an initial wavelet transform-filter operation upon the input signal dataset to produce a first-level filtered dataset, wherein the initial wavelet transform-filter operation comprises a wavelet transform of the input signal dataset, a filter operation upon the results of the wavelet transform, and an inverse transform upon the results of the filter operation to produce the first-level filtered dataset;

performing a first wavelet transform-filter operation upon the first-level filtered dataset, comprising the steps of:
  selecting a first scale-wavelet function pair for application to the first-level filtered dataset;
  transforming the first-level filtered dataset by applying the selected first scale-wavelet function pair to the first-level filtered dataset;
  then filtering results of the transforming step using a first selected filter; and
  then inverse-transforming results of the filtering step, by applying the selected first scale-wavelet function pair thereto, to produce a first second-level filtered dataset; and displaying the first second-level filtered dataset on the graphics display.

17. The system of claim 16, wherein the programmed computer is also for:

performing a second wavelet transform-filter operation upon the first-level filtered dataset, comprising the steps of:
  selecting a second scale-wavelet function pair for application to the first-level filtered dataset;
  transforming the first-level filtered dataset by applying the selected second scale-wavelet function pair to the first-level filtered dataset;
  then filtering results of the transforming step using a second selected filter; and
  then inverse-transforming results of the filtering step, by applying the selected second scale-wavelet function pair thereto, to produce a second second-level filtered dataset; and displaying the second second-level filtered dataset on the graphics display.

18. The system of claim 17, wherein the programmed computer is also for:

performing a third wavelet transform-filter operation upon the first second-level filtered dataset, comprising the steps of:
  selecting a third scale-wavelet function pair for application to the first second-level filtered dataset;
  transforming the first second-level filtered dataset by applying the selected third scale-wavelet function pair to the first second-level filtered dataset;
  then filtering results of the transforming step using a third selected filter; and
  then inverse-transforming results of the filtering step, by applying the selected third scale-wavelet function pair thereto, to produce a third-level filtered dataset; and displaying the third-level filtered dataset.

19. A computer-readable memory having a storage medium configured so that, when read and used by a computer, the computer is directed to analyze geological measurements taken at a survey region of the earth by a plurality of operations comprising:

retrieving, from a computer memory, an input signal dataset corresponding to a discrete space-domain representation of geological measurements over a selected portion of the survey region;

performing an initial wavelet transform-filter operation upon the input signal dataset to produce a first-level filtered dataset, wherein the initial wavelet transform-filter operation comprises a wavelet transform of the input signal dataset, a filter operation upon the results of the wavelet transform, and an inverse transform upon the results of the filter operation to produce the first-level filtered dataset;

performing a first wavelet transform-filter operation upon the first-level filtered dataset, comprising the steps of:
  selecting a first scale-wavelet function pair for application to the first-level filtered dataset;
  transforming the first-level filtered dataset by applying the selected first scale-wavelet function pair to the first-level filtered dataset;
  then filtering results of the transforming step using a first selected filter; and
  then inverse-transforming results of the filtering step, by applying the selected first scale-wavelet function pair thereto, to produce a first second-level filtered dataset; and displaying the first second-level filtered dataset.

20. The computer-readable memory of claim 19, wherein the plurality of operations further comprises:

performing a second wavelet transform-filter operation upon the first-level filtered dataset, comprising the steps of:
  selecting a second scale-wavelet function pair for application to the first-level filtered dataset;
  transforming the first-level filtered dataset by applying the selected second scale-wavelet function pair to the first-level filtered dataset;
  then filtering results of the transforming step using a second selected filter; and
  then inverse-transforming results of the filtering step, by applying the selected second scale-wavelet function pair thereto, to produce a second second-level filtered dataset; and displaying the second second-level filtered dataset.

21. The computer-readable memory of claim 20, wherein the plurality of operations further comprises:

performing a third wavelet transform-filter operation upon the first second-level filtered dataset, comprising the steps of:
  selecting a third scale-wavelet function pair for application to the first second-level filtered dataset;
  transforming the first second-level filtered dataset by applying the selected third scale-wavelet function pair to the first second-level filtered dataset;
  then filtering results of the transforming step using a third selected filter; and
  then inverse-transforming results of the filtering step, by applying the selected third scale-wavelet function pair thereto, to produce a third-level filtered dataset; and displaying the third-level filtered dataset.

* * * * *